US009607442B2

(12) United States Patent
Hamilton, II et al.

(10) Patent No.: US 9,607,442 B2
(45) Date of Patent: Mar. 28, 2017

(54) DIFFERENTIAL RESOURCE APPLICATION IN VIRTUAL WORLDS BASED ON PAYMENT AND ACCOUNT OPTIONS

(71) Applicant: INTERNATIONAL BUSINESS MACHINES CORPORATION, Armonk, NY (US)

(72) Inventors: Rick A. Hamilton, II, Charlottesville, VA (US); Steven M. Harrison, Bremerton, WA (US); Brian M. O'Connell, Cary, NC (US); Clifford A. Pickover, Yorktown Heights, NY (US); Keith R. Walker, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/050,962

(22) Filed: Feb. 23, 2016

(65) Prior Publication Data
US 2016/0171783 A1     Jun. 16, 2016

Related U.S. Application Data

(63) Continuation of application No. 14/148,192, filed on Jan. 6, 2014, now Pat. No. 9,311,693, which is a continuation of application No. 12/120,492, filed on May 14, 2008, now Pat. No. 8,648,875.

(51) Int. Cl.
| | |
|---|---|
| *G06T 19/20* | (2011.01) |
| *G06T 5/00* | (2006.01) |
| *G06T 15/00* | (2011.01) |
| *G06Q 30/02* | (2012.01) |

(52) U.S. Cl.
CPC ............ *G06T 19/20* (2013.01); *G06Q 30/02* (2013.01); *G06T 5/00* (2013.01); *G06T 15/005* (2013.01); *G06T 2200/16* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,036,601 A | 3/2000 | Heckel | |
| 6,070,149 A | 5/2000 | Tavor et al. | |
| 6,118,456 A | 9/2000 | Cooper | |
| 6,256,043 B1 | 7/2001 | Aho et al. | |
| 6,329,986 B1 | 12/2001 | Cheng | |
| 6,396,509 B1 | 5/2002 | Cheng | |
| 6,738,065 B1 | 5/2004 | Even-Zohar | |
| 6,801,930 B1 | 10/2004 | Dionne et al. | |

(Continued)

*Primary Examiner* — Ke Xiao
*Assistant Examiner* — Jed-Justin Imperial
(74) *Attorney, Agent, or Firm* — Lisa Ulrich; Andrew M. Calderon; Roberts, Mlotkowski, Safran, Cole & Calderon, P.C.

(57) ABSTRACT

A system and method for enhancing the rendering of one or more objects based on payment and account options. The system includes a computer infrastructure configured to control enhancement rendering of an object in a virtual universe by providing at least one augmentation attribute to a tag of the object. The method includes providing enhancement rendering of an object in a virtual universe by augmenting the object based on a status of a user viewing the object.

14 Claims, 5 Drawing Sheets

(56) References Cited

U.S. PATENT DOCUMENTS

| | | |
|---|---|---|
| 6,845,486 B2 | 1/2005 | Yamada et al. |
| 6,928,414 B1 | 8/2005 | Kim |
| 6,954,728 B1 | 10/2005 | Kusumoto et al. |
| 6,968,315 B1 | 11/2005 | Nakisa |
| 6,981,220 B2 | 12/2005 | Matsuda |
| 7,054,831 B2 | 5/2006 | Koenig |
| 7,076,445 B1 | 7/2006 | Cartwright |
| 7,184,047 B1 | 2/2007 | Crampton |
| 8,029,359 B2 | 10/2011 | Cheng |
| 2001/0020955 A1 | 9/2001 | Nakagawa et al. |
| 2002/0040327 A1 | 4/2002 | Owa |
| 2002/0138607 A1 | 9/2002 | O'Rourke et al. |
| 2003/0005439 A1 | 1/2003 | Rovira |
| 2004/0030741 A1 | 2/2004 | Wolton et al. |
| 2004/0064351 A1 | 4/2004 | Mikurak |
| 2004/0133691 A1 | 7/2004 | Shimada |
| 2004/0143495 A1 | 7/2004 | Koenig |
| 2004/0148221 A1 | 7/2004 | Chu |
| 2004/0162759 A1 | 8/2004 | Willis |
| 2004/0193441 A1 | 9/2004 | Altieri |
| 2005/0030309 A1 | 2/2005 | Gettman et al. |
| 2005/0086605 A1 | 4/2005 | Ferrer et al. |
| 2005/0086612 A1 | 4/2005 | Gettman et al. |
| 2006/0015904 A1 | 1/2006 | Marcus |
| 2006/0111979 A1 | 5/2006 | Chu |
| 2006/0143095 A1 | 6/2006 | Sandus et al. |
| 2006/0178968 A1 | 8/2006 | Jung et al. |
| 2006/0178975 A1 | 8/2006 | Jung et al. |
| 2006/0287105 A1 | 12/2006 | Willis |
| 2007/0038765 A1 | 2/2007 | Dunn |
| 2007/0061202 A1 | 3/2007 | Ellis et al. |
| 2007/0061204 A1 | 3/2007 | Ellis et al. |
| 2007/0101276 A1 | 5/2007 | Yuen |
| 2007/0118394 A1 | 5/2007 | Cahoon |
| 2007/0118420 A1 | 5/2007 | Jung et al. |
| 2007/0129148 A1 | 6/2007 | Van Luchene |
| 2007/0156509 A1 | 7/2007 | Jung et al. |
| 2008/0098064 A1 | 4/2008 | Sherinian |
| 2008/0207327 A1* | 8/2008 | Van Luchene .......... A63F 13/12 463/42 |
| 2008/0309675 A1 | 12/2008 | Fleury et al. |
| 2009/0132435 A1 | 5/2009 | Titus et al. |
| 2009/0158170 A1 | 6/2009 | Narayanan et al. |
| 2009/0260004 A1 | 10/2009 | Datta et al. |

\* cited by examiner

DIFFERENTIAL RESOURCE APPLICATION IN VIRTUAL WORLDS BASED ON PAYMENT AND ACCOUNT OPTIONS

FIELD OF THE INVENTION

The invention generally relates to enhanced rendering of an object and, more particularly, to augmenting one or more objects based on payment and account options.

BACKGROUND OF THE INVENTION

Virtual universes (VUs) are computer-based simulations of the real world where users interact with one another using online identities. These online identities, known as avatars, can be chosen by a user to graphically represent himself within the VU. Once a graphical representation is chosen, the representation is rendered in the VU using a variety of geometry, viewpoint, texture, and lighting information. Objects within the VU are also rendered using similar information.

Three dimensional rendering within a VU allows avatars and objects to appear more realistic. Three dimensional rendering is typically done by assigning a number of coordinates to an object and then calculating how light interacts with the object based on the assigned coordinates. Calculating how light is used within a VU requires a determination of how light gets from one point to another, and how light interacts with different surfaces of the object. The more coordinates that are available, the better the rendering. The quality of a rendering also depends on the type and amount of information that is available to describe an object including the detail, arrangement, and total number of objects used to create the rendering.

While it is possible to continually render everything in a VU at the highest level of enhancement to all users, this produces a very high computation load on a VU's servers. This high computation load is ultimately passed onto the users in the form of slower renderings, slower refresh rates, or a variety of other hindrances. Furthermore, while the high level enhancement renderings may be appreciated in certain circumstances, there are a number of circumstances in which continual high level enhancement renderings are not even noticed by the user. For example, when a user is walking down a street, the user looks in a certain direction. The user's view is limited to a certain peripheral, such as the total view that can be rendered on a computer monitor. Computationally, it would be wasteful to enhance everything surrounding the user when the user can only view a small subset of the surroundings. Additionally, it would be wasteful to enhance everything within the user's subset if, for example, the user is rushing through an area to get to an ultimate destination. Furthermore, it would be wasteful to enhance a number of objects that the user has no preference in viewing enhanced, or to provide an enhanced rendering to users without the hardware requirements to appreciate the rendering. In other words, a number of factors need to be considered when determining the amount of rendering, and when something should be rendered to a user.

Accordingly, there exists a need in the art to overcome the deficiencies and limitations described hereinabove.

SUMMARY OF THE INVENTION

In a first aspect of the invention, a system comprises a server having a database containing data. The system comprises a computer infrastructure configured to control enhancement rendering of an object in a virtual universe by providing at least one augmentation attribute to a tag of the object.

In another aspect of the invention, a method comprises providing enhancement rendering of an object in a virtual universe by augmenting the object based on a status of a user viewing the object.

In yet another aspect of the invention, a method comprises providing a computer infrastructure being operable to detect a request to augment one or more objects and transmit an augmentation attribute associated with the one or more objects.

In another aspect of the invention, a computer program product comprising a computer usable medium having readable program code embodied in the medium is provided. The computer program product includes at least one component to: determine if an object has an augmentation attribute with more than one level of enhancement; ascertain a user status and/or a payment level; permit a user access to an augmentation attribute based on the user status and/or the payment level; and augment the object by providing enhancement rendering to the object.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention is directed to a method and system for enhancing rendering of an object and, more particularly, to augmenting one or more objects based on payment and/or account options. By implementing the method and system of the invention, it becomes possible for a user to have enhanced renderings of one or more objects while participating in a VU. These enhanced renderings may allow the user to augment such senses as sight, smell, touch, taste, or audio within a VU.

By using this invention, users obtain an enhanced rendering of a desired object or avatar within the VU including the user's own avatar. These augmentations may provide enhanced rendering for the user, for the user and selected others, or only to other users. The level of enhancement, who can experience the enhanced rendering, how frequent the enhanced rendering occurs, as well as many other features relating to an enhanced rendering, are determined by the user's status within the VU, by an applicable fee structure, or by a variety of payment schemes available within the VU.

System Environment

Figure 1:
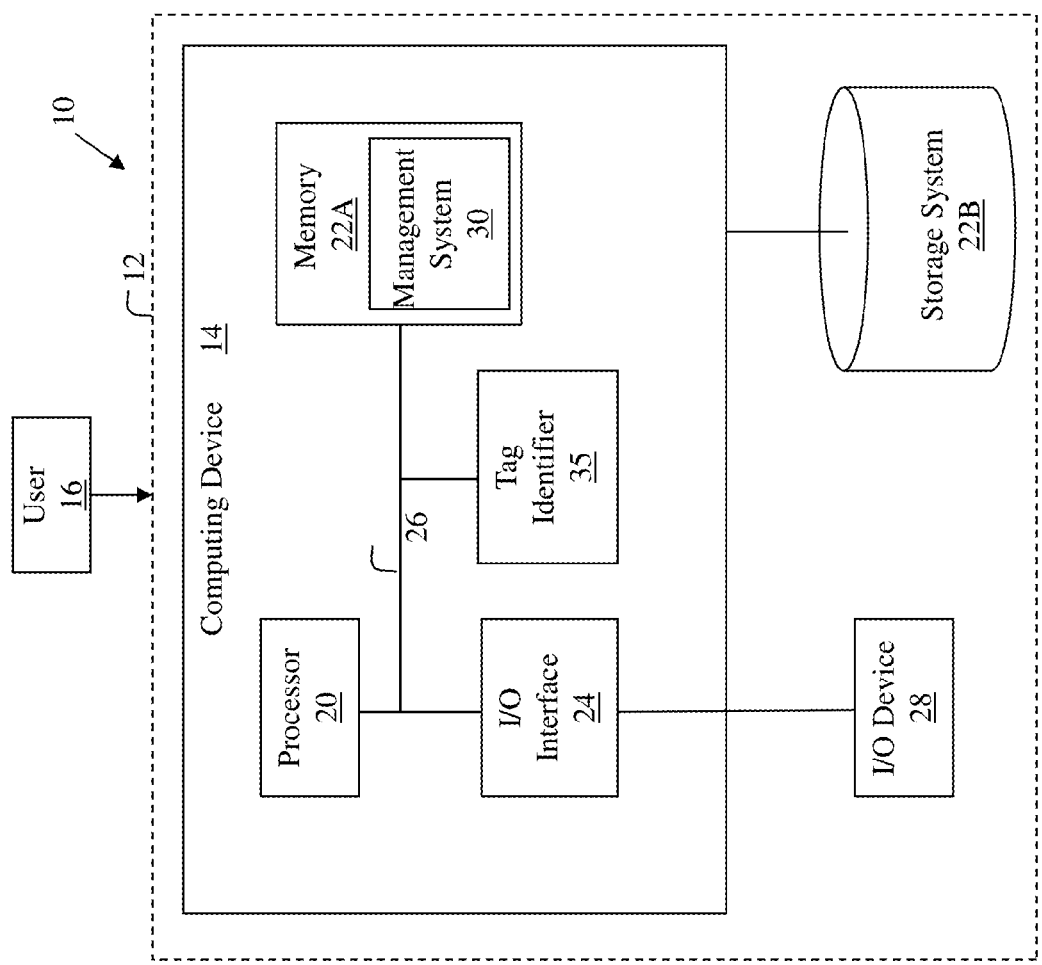
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14 that comprises a management system 30, which makes computing device 14 operable to determine whether enhanced rendering is required by using a tag identifier 35.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. For example, the I/O device 28 can comprise any device that enables a user 16 to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Object Rendering

Figure 2:
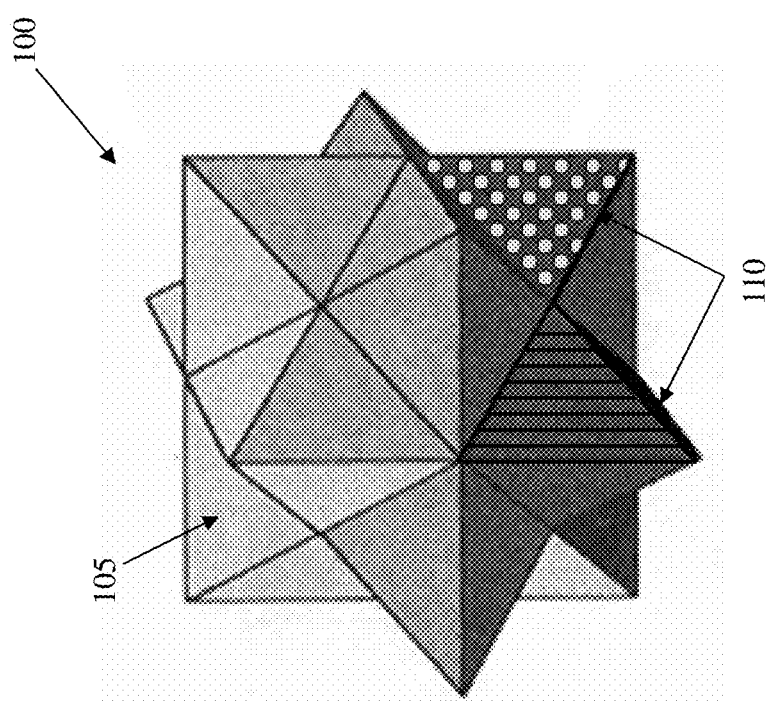
FIG. 2 shows an example of an object, which may be combined with other objects to render a larger object in accordance with the invention.

FIG. 2 shows an exemplary object rendering in accordance with the invention. When a user participates in a VU, the user encounters a number of objects 100, representatively shown in FIG. 2. Each object 100 is represented by one or more smaller objects 105, or building blocks, that give the object its distinguishing characteristics. These smaller objects 105 may be represented by a number of different forms, or combination of forms, which give the illusion of a cohesive object. For example, the smaller objects 105 may be represented by one or more polygons that are fitted together to form an object 100. Alternatively, the smaller objects 105 can be comprised of boxes, prisms, spheres, cylinders, tori, tubes, rings, etc. Each smaller object 105 may be further defined by a number of textures, colors, or other details 110 that are used to make the smaller object 105 look a certain way. By assigning, for example, one shade to one object and another shade to an adjacent object, an illusion of depth may be created.

The smaller objects 105 may be rearranged, resized, rotated, twisted, tapered, dimpled, linked, etc., such that the final product of the combination of smaller objects 105, i.e., the larger object 100, is rendered with enough detail for the user to ascertain what the object represents. The level of enhancement, and also the computation costs associated with producing the rendering, may vary depending on the detail, the arrangement, and the total number of smaller objects 105 used to create the rendered object 105. Generally, the more detailed the object, the better the rendering, and the higher the computational costs required to render the object.

Object Data Structure

Figure 3:
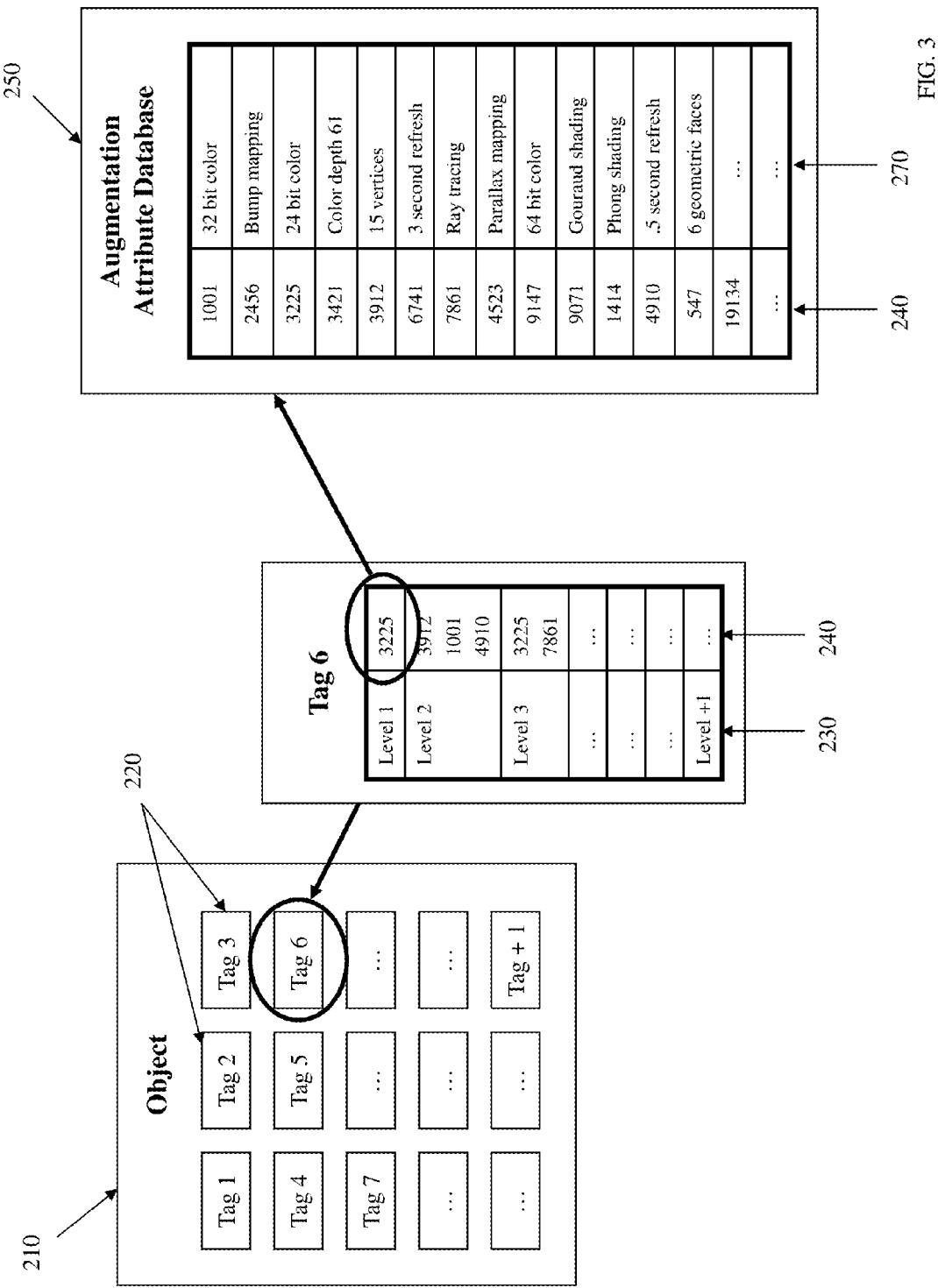
FIG. 3 shows an illustrative high level view of an object's data structure in accordance with the invention.

FIG. 3 shows an embodiment of an object data structure. The object 210 is structured to include a number of tags 220. The tags 220 may be used to describe one or more levels of enhancement 230. As described below, one or more augmentation attributes 270 are stored in the augmentation attribute database 250. The object data structure further permits one or more levels of enhancement 230. These levels of enhancement 230 are used to describe the amount of detail that should be used to render an object.

More specifically, an object 210 has at least one metadata field that contains instructions describing how the object 210 may be rendered. In the example illustrated in FIG. 3, the metadata field is represented by one or more tags 220. The data stored in the tags 220 may be represented by any number of data structures, and each tag 220 may be used to describe one or more levels of enhancement 230. For example, in one embodiment, each tag 220 within the object 210 may represent a different level of enhancement 230. In another embodiment, two or more tags 220 may be used to represent the different levels of enhancement 230. In yet another embodiment, all of the levels of enhancement 230 may be contained in a single tag 220. Tags 220 not storing information about a level of enhancement 230, may store other information relating to the object 210.

Different levels of enhancement 230 may represent different characteristics depending on the object 210. For example, an object 210 may have only one level of enhancement 230. Typically this indicates that the object 210 has a standard rendering but does not have an enhanced rendering. Therefore, the object 210 is rendered the same way for all users, regardless of the user's status or payment scheme. However, in an alternative embodiment, an object 210 may have a single level of enhancement 230, but that level of enhancement 230 may indicate that an object 210 is either visible or not visible depending on the user's status, whether the user has paid to view the object, or a number of alternative schemes.

The objects 210 that include different levels of enhancement 230 may also represent a number of different scenarios. For example, an object having multiple levels of enhancement 230 may have one level of enhancement 230 associated with preferred users, and another level of enhancement 230 associated with standard users. Other embodiments may include multiple levels of low, intermediate, or high level enhancements 230 that are based on a user's status and/or a payment scheme. Yet other embodiments may include levels of enhancement 230 that may only be achieved by utilizing one or more payment schemes.

Regardless of the number of levels of enhancement associated with an object 210, a specific user may be entitled to a level of enhancement based on a number of considerations. For example, certain levels of enhancement 230 may only be open to users that have a certain user status. The user status may be related to actions taken by an user within a VU, such as how frequently the user enters the universe, how many interactions the user has had in the VU within the last month, how much money the user has spent in the VU, as well as a number of other considerations. Also, the user status may be associated with a fee that is paid for a heightened user status, a temporary trial period, or a promotion that permits a user to obtain a certain user status for a temporary or other predetermined duration of time.

Additional embodiments also permit users to obtain enhanced renderings based on a variety of payment schemes. For example, certain levels of enhancement 230 may be open to users based on a per object fee structure, which permits a user to pay a specific amount of money to obtain an enhanced rendering of a specific object 210. As an illustration, a user may desire to view an enhanced rendering of an animal at a zoo. To obtain this enhanced rendering, the user may pay a flat fee for the enhanced rendering of the animal every time the animal is viewed by the user. In embodiments, the user may be permitted to determine a level of enhancement by paying a fee associated with a respective level of enhancement 230.

Alternative payment schemes are also available. For example, in one embodiment, a user may obtain a subscription, which permits the user to obtain a higher level of enhancement 230 when one or more objects 210 are rendered in the VU. Additional embodiments may provide discounted rates to users depending on the user status.

In yet another embodiment, a user may be charged each time the user desires a specific level of enhancement 230; in other words, a pay per enhanced view scheme. For example, a user may view the Mona Lisa while visiting an art museum in a VU. The user may want to view the painting with a higher level of enhancement 230, therefore, the user may choose to pay for an enhanced view. However, if the user chooses to view another painting and then return to the Mona Lisa, the enhanced rendering of the Mona Lisa may no longer be available. Also, different embodiments may permit the rendering to last only as long as the user is viewing the object, as long as the user is in a certain vicinity of the object, or the user has rendered the object within a certain period of time. In other words, alternative embodiments may permit the user to come back to the Mona Lisa, given certain restrictions, and view the Mona Lisa with the enhanced rendering.

Another payment scheme may be used to charge a user for each requested rendering enhancement to an object. In other words, a pay per enhancement scheme is contemplated by the invention. For example, if a user approaches the Mona Lisa while in an art museum, then the user can choose specific enhancements that the user desires to be rendered. This means, for example, that the user could choose to have Gouraud, Phong, or Blinn-Phong shading applied to the Mona Lisa instead of a standard flat shading. Thus, using a pay per enhancement scheme, the user can choose a single enhancement or, alternatively, the user can choose more than one enhancement that is available for the object 210. Similar to a pay per enhanced view scheme, alternative embodiments may permit the user to come back to the Mona Lisa, given certain restrictions, and view the Mona Lisa with the enhanced rendering.

It should be understood that many alternative payment schemes are available to provide an enhanced rendering for an object 210. Additionally, the payments accrued during these schemes may be paid using a number of VU or electronic fund transfer methods. In an alternative embodiment, the fee for the enhancement may vary depending on the user's original level of enhancement 230. However, other embodiments may maintain a flat fee instead of varying the fee in relation to the user's original level of enhancement 230. In any case, the fee may be paid to a service provider, in exchange for the enhanced renderings.

In embodiments, when a user obtains a higher level of enhancement 230 for an object 210, the user experiences the enhanced rendering of the object. This enhanced rendering is typically only available to the individual user that purchased the enhancement, has the required user status, or has obtained the enhancement through a variety of other predetermined mechanisms. Typically, in such instances, other users will not have access to the same level of enhancement 230 as the users that have acquired the higher level of enhancement 230. In other words, standard users will not view the object rendered with enhancement. However, in alternative embodiments, a user may permit specific users, e.g., users within a specific area; to have the enhanced rendering. For example, a school teacher may purchase a higher level of enhancement for a group of students so that they can view enhanced renderings. This may be done in a number of ways including: adding an additional charge per student (user), charging a flat rate for a group rendering, or charging a variable flat rate depending on the number of users in the group.

In a further embodiment, a service provider, advertiser, etc., may allow certain objects to be viewed as enhanced renderings for promotional purposes. For example, within a virtual store, there may be a number of different goods that are sold to users within the VU. The store owner may decide to use an enhancement scheme to enhance an object within the virtual store so users within the store are allowed to view a higher rendering of an object 210, and are therefore more likely to buy the object 210. In one embodiment, the store owner may provide a temporarily enhanced rendering of an object 210 only to first time visitors of the virtual store, or only when the user picks up the object 210 while in the store. Alternatively, a user may be in the virtual store and choose to enhance an object 210 to obtain an enhanced rendering before purchasing the object 210 from the virtual store.

In another embodiment, an advertiser selling objects 210 in the virtual store may pay for the object 210 to have an enhanced rendering while in the store, to better promote the advertiser's merchandise. Alternatively, the advertiser, or even the user purchasing the object, may pay for the object 210 to have a higher level of enhancement 230 not only in the store, but also after leaving the store. Alternatively, the advertiser, or user, may purchase a higher level of enhancement 230 for one part of the object 210, such as a logo on the object 210. This benefits the advertiser because the brand or trademark is presented with an enhanced rendering throughout the VU.

In a further embodiment, a VU administrator, service provider, advertiser, etc., may permit a user to view an enhanced rendering of an object 210 once the user is within a certain distance of the object 210. For example, a virtual store owner may enhance the rendering of an object 210 whenever a user is within five feet of the object 210. Alternatively, the enhancement may be rendered when a user is projected to reach the object 210 within a certain period of time. This permits a user to view the object 210 at a higher level of enhancement 230 prior to reaching the object, wherein the enhancement is either based on a fee structure or at no cost. In addition to obtaining a higher level of enhancement 230 when approaching an object 210, it should be understood that the user may also choose to obtain further enhancement of the object 210 as described above.

Once a level of enhancement 230 is determined, one or more augmentation attributes 270 can be associated with the level of enhancement 230. As described above, augmentation attributes 270 define how the object 210 is rendered under the determined level of enhancement 230. Thus, each augmentation attribute 270 may represent one or more features that enhance or change the rendering of an object 210. For example, an augmentation attribute 270 may represent an object's geometric detail, a rendering method, a color palette, and/or the refresh rate associated with an object 210.

An augmentation attribute 270 may be very broad, such as assigning color palette number "3" to an object 210. However, augmentation attributes 270 may also be very detailed. For example, an object's geometric detail may be broken down to include a texture mapping enhancement for an object 210. The texture mapping may be further broken down to include parallax mapping, bump mapping, clamping, wrapping, normal mapping, displacement mapping, texture filtering, texture splatting, or a number of other texture mapping technologies that may be used to describe the object 210. This same detailed breakdown may be used for all object augmentation attributes 270, which is not limited to rendering methods, color palettes, and refresh rates.

Augmentation attributes 270 may be represented in a number of ways. In one embodiment, an augmentation attribute 270 may be stored in the tag 220, where each tag 220 may have one or more augmentation attributes 270 associated with the object 210. To allow for alternative storage mechanisms, augmentation attributes 270 may be stored in a tag 220 according to an augmentation attribute ID 240. These augmentation attribute IDs 240 may be indexed or arranged in a separate augmentation attribute database 250 for easy recovery.

According to one embodiment, each augmentation attribute 270 is associated with at least one augmentation attribute ID 240. As such, the augmentation attribute 270 may be unique to a specific object 210 and a specific level of enhancement 230. Alternatively, an augmentation attribute 270 may be associated with multiple levels of enhancement 230 relating to multiple objects 210. In other embodiments, a single augmentation attribute ID 240 may be used to represent more than one augmentation attribute 270. For example, an augmentation attribute ID 240 of "7861" and "6741" may represent the augmentation attributes 270 for ray tracing and a three second refresh rate.

While some objects 210 may have distinctly unique levels of enhancement 230 having completely different augmentation attributes 270, other objects may have one or more levels of enhancement 230 that share one or more augmentation attributes 270. For example, an object 210 may have a level of enhancement 230 including 16 bit color and bump mapping. That same object 210 may also have a higher level of enhancement 230 including 32 bit color and bump mapping. Hence, the object 210 may have certain augmentation attributes 270 that stay the same between one or more levels of enhancement 230 and other augmentation attributes 270 that differ between one or more levels of enhancement 230.

The details associated with an enhancement rendering may appear seamlessly to the user, such that the user does not know that a specific object 210 has been enhanced. Alternatively, in other embodiments, a user may be informed that an object 210 has multiple levels of enhancement and the user may be permitted to choose a level of enhancement 230 for the object 210, or choose one or more augmentation attributes 270 associated with the object 210. For example, a user may pick up an object 210 in the VU, select a higher level of enhancement 230, and have that enhancement rendered to the user nearly instantaneously.

Processes According to Embodiments of the Invention

Figure 4:
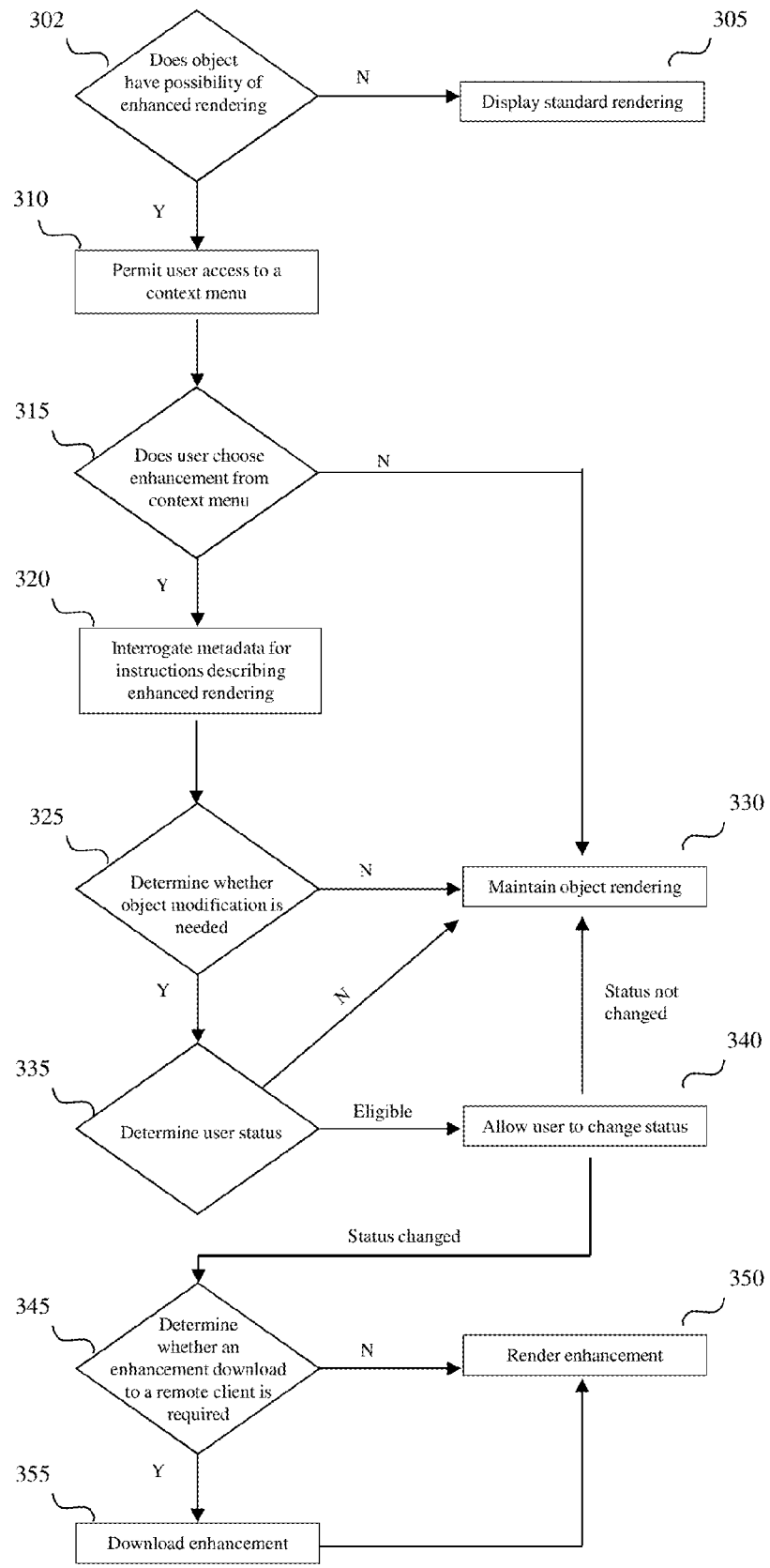
FIG. 4 is a flow chart showing illustrative steps in accordance with the invention.

FIG. 4 is a flow diagram implementing steps of the invention which may be implemented in the environment of FIG. 1. FIG. 4 may equally represent a high-level block diagram of the invention. The steps of FIG. 4 may be implemented and executed from either a server, in a client server relationship, or they may run on a user workstation with operative information conveyed to the user workstation to allow for enhanced renderings based on payment or user status. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semi-conductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 4 is a flow chart illustrating a number of processes in accordance with the invention. At step 302, a determination is made as to whether an object has the possibility of being enhanced, i.e., if the object has more than one level of enhancement. In one embodiment, a tag interpreter may be used to view the object's metadata and determine the total number of levels of enhancement that are available for the object. Alternative embodiments may keep track of the total levels of enhancement as a separate variable, or even via a pointer, which can be easily ascertained when a user initially approaches the object.

If it is determined that an object cannot be enhanced, at step 305 the standard rendering of the object is maintained to all users in the VU. However, if an enhanced rendering for an object does exist, then the user may be given access to a context menu at step 310. A context menu presents the user with a selectable mechanism for the user, or client, to request the enhancement rendering at a remote location from a virtual universe server. An example of a context menu of step 310 is discussed below in more detail in FIG. 5.

At step 315, a determination is made as to whether the user selected an enhancement from the context menu. If the user does not choose an enhancement from the context menu, then the object rendering is maintained in its original state at step 330.

If an enhancement is chosen from the context menu at step 315, at step 320 the object's metadata is interrogated to determine the instructions used to describe the enhanced rendering. In one embodiment, the metadata may be represented as one or more tags having augmentation attributes associated with the one or more tags. The object's metadata may be interrogated by a tag interpreter, or similar interpretation mechanism.

At step 325, a determination is made as to whether object modification is needed, as requested by a user. In one embodiment, the determination of whether an object requires modification may be performed using a tag interpreter. By way of example, the tag interpreter may be used to compare the current rendering with a proposed new rendering to determine if there are any differences. Generally, object modification is not needed if a user selects the same level of rendering as is already visible to the user. Alternatively, in another embodiment, object modification may not be needed if the user's hardware limitations would limit the user from experiencing the enhanced rendering. If object modification is not needed, then the object's rendering is maintained, at step 330.

If object rendering is needed, at step 335, a determination is made as to the user's status. The user's status may include, for example, whether the user is a preferred user within the VU, whether the user has already paid for the enhancement, or whether the enhancement has already been provided by another user in the VU. Additional factors may also be used to determine user status. For example, in one embodiment, the user may request, in advance, that an online account be debited every time a certain type of object appears within a certain area. Therefore, the user does not have to pay for a permanent enhancement of the object, or a different user status, yet is still permitted to view the enhancement without having to individually enhance the object every time it occurs within the specified area of a VU. An example of a payment option menu according to step 340 is discussed below in more detail in FIG. 6.

If the user is found to be eligible at step 335, at step 340, the user may change status to obtain an enhanced rendering of an object. By way of example, a user may change status by: participating in a payment scheme, obtaining a subscription, increasing user status within the VU via high involvement in the VU, and/or by paying a fee to become a preferred user. If the user is not successful in changing status, then the object's original rendering will be maintained at step 330. However, if the user is successful in changing status at step 340, or if the user already has the requisite user status, then a determination is made at step 345 as to whether the user has the resources required for the enhanced rendering. In one embodiment, this may be performed using a pass through tag identifier, which is configured to determine whether an enhancement download to a remote client is required.

An enhancement download may be required for a number of reasons. For example, a user within a VU requesting an enhanced rendering may not have all of the attributes that are required to render the desired level of enhancement. Also, certain VU's may permit a user to download a basic version of the VU in order for the user to save space on the user's computer; however, this basic version may not have the texture, shading, or other attributes that are required for a specific enhancement to be rendered. Alternatively, a VU may offer a new attribute that was not originally available when the user acquired the attributes associated with the VU. In any case, a user that does not have the requirements needed to render a specific enhancement may download the enhancement from a remote client at step 355.

Downloading an augmentation attribute may be accomplished by allowing the user to personally download the required attributes. However, in alternative embodiments, once it is determined that the user is missing requisite augmentation attributes, then the augmentation attributes for the enhanced rendering may be sent to the user automatically from a remote client. Some embodiments may send all of the augmentation attributes associated with the enhanced rendering, while other embodiments may send only those augmentation attributes that the user is missing. By sending only those augmentation attributes that the user is missing, it is possible to reduce the amount of computational resources consumed in the transfer. This results in a faster download for the user. Also, while some embodiments require the user to have all of the augmentation attributes before the enhancement can be rendered, other embodiments may permit an object to be partially rendered while the user finishes downloading the missing augmentation attributes. This may be particularly useful when the user has difficulty downloading one or more augmentation attributes, such that the user's ability to participate in the VU would be inhibited.

After the user has all of the augmentation attributes (regardless of whether the user originally possessed the augmentation attributes or whether the user obtained the augmentation attributes by downloading them) then the enhancement may be rendered at step 350. The rendering may stem from either step 345 or step 355

Throughout the process of providing enhanced object renderings to users, it may be necessary to adjust computation resources to accommodate for utilization of the augmenting. For example, a user with a standard user status will generally view lower object renderings than a user having a preferred user status. However, if the user having a standard user status decides to change user status to a preferred status, then the user will view the enhanced renderings associated with the new preferred user status. These enhanced renderings generally contain more augmentation attributes and also require additional computing power to display the enhanced renderings. Therefore, the change in user status requires more resources in aggregate from the server. This increased server load, and the computation resources associated with the increased server load, are typically considered when adjusting loads between one or more servers. The adjustment of computational resources to accommodate for utilization of augmentations may be accomplished using existing technologies such as known server load balancing.

Menu Options

Figures 5, 6:
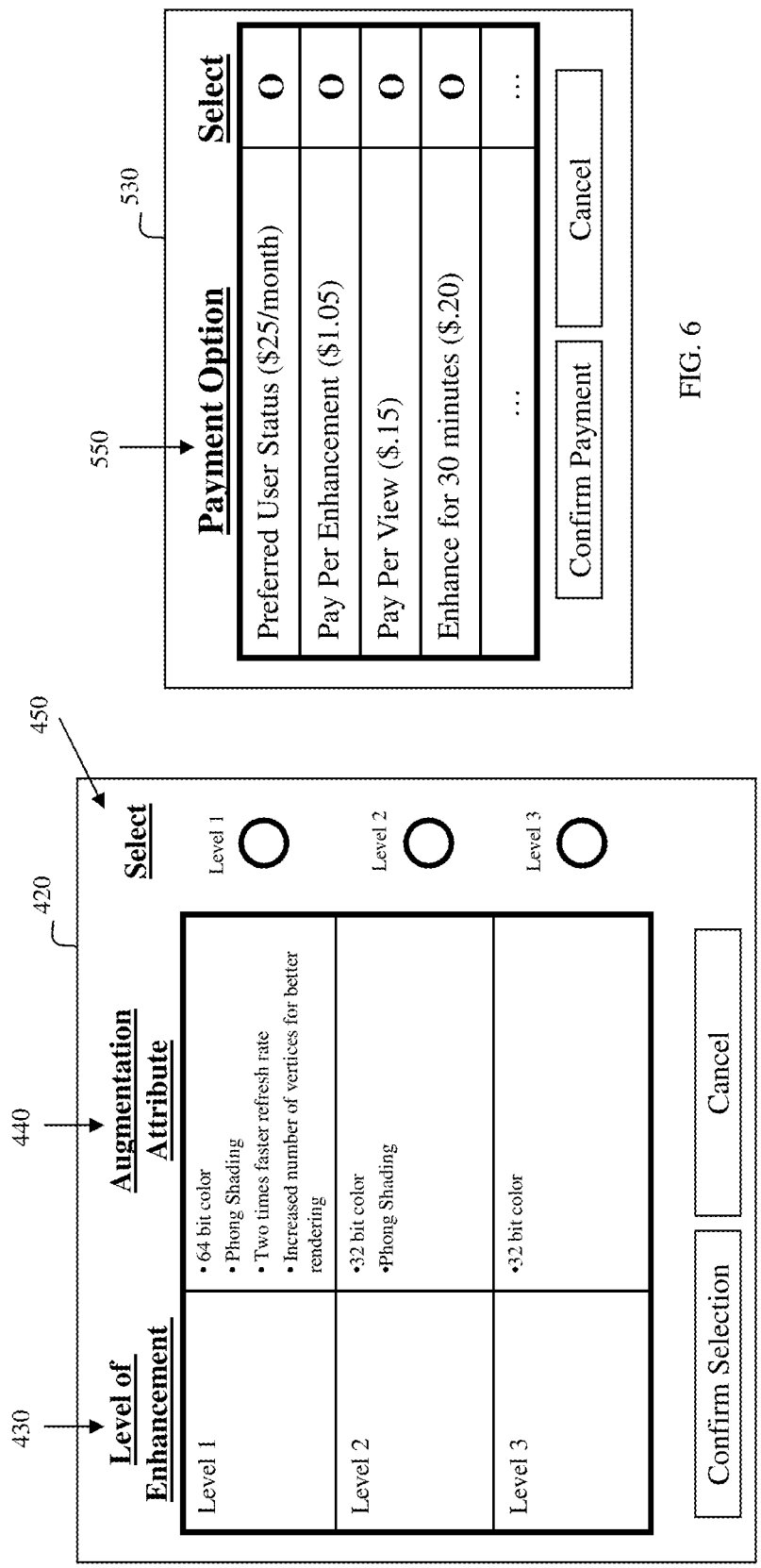
FIG. 5 shows an illustrative context menu in accordance with the invention.
FIG. 6 shows an illustrative payment option menu in accordance with the invention.

FIG. 5 shows an example of a context menu implemented in accordance with the invention. In the illustrated embodiment, the context menu 420 displays a variety of information to aid the user in deciding whether to enhance the object. This information may include the level of enhancement 430 and the details associated with the rendering, such as a list of attributes 440 associated with the level of enhancement 430. Once a level of enhancement 430 is selected via selection of reference level 450 from the context menu 420, the user can choose a user status or payment option.

FIG. 6 illustrates a payment option menu 530 in accordance with the invention. The menu includes payment options 550, which may vary depending on the object being rendered and the level of enhancement. For example, a user may be given payment options for an enhanced rendering of an object: every time the user encounters the object; only during the current rendering of the object; a limited period of time; or a number of other conceivable payment options. While FIG. 6 shows the payment option 550 as a separate screen, which may be encountered after choosing a level of enhancement, it should be understood that the payment options 550 may be presented to the user when the user first chooses a level of enhancement. Alternative embodiments may also permit the user to view a range of payment options 550 before viewing the different levels of enhancement.

While the invention has been described in terms of embodiments, those skilled in the art will recognize that the invention can be practiced with modifications and in the spirit and scope of the appended claims.

What is claimed is:

1. A method for controlling display of an object on a display device comprising:
   determining whether one or more levels of enhancement rendering on the display device is to be applied to the object displayed on the display device;
   obtaining instructions describing the one or more levels of the enhancement rendering of the object;
   determining a status of a user;
   providing one or more levels of the enhancement rendering of the object in a virtual universe by augmenting the display of the object on the display device based on the status of the user viewing the object, the status of the user being related to one or more actions taken by the user within the virtual universe; and
   permitting the user to access a context menu prior to obtaining the instructions describing the one or more levels of the enhancement rendering of the object,
   wherein the augmenting the object on the display device includes at least one of increasing: a refresh rate of the object; a geometric detail of the object; and a color palette, and
   wherein the context menu shows the number of levels of enhancement available to the user for the object and a list of attributes associated with the levels of enhancement including the object's geometric detail, the color palette and the refresh rate associated with each of the levels of enhancement.

2. The method of claim 1, further comprising modifying the object when the user accesses another level of the one or more levels of the enhancement rendering.

3. The method of claim 1, further comprising adjusting computational resources to accommodate for utilization of the augmenting.

4. The method of claim 1, wherein:
   the augmenting the object on the display device further includes a rendering method; and
   the status of the user comprises how many interactions the user has had in the virtual universe within a predetermined time period and how much money the user has spent in the virtual universe.

5. The method of claim 1, further comprising allowing one or more users temporary access to an augmentation attribute which provides the one or more levels of the enhancement rendering.

6. The method of claim 1, further comprising determining whether an augmentation attribute associated with the one or more levels of the enhancement rendering is required to be sent to the user.

7. The method of claim 6, further comprising allowing the user to change status after determining the status of the user and prior to determining whether the augmentation attribute associated with the one or more levels of the enhancement rendering is required to be sent to the user.

8. The method of claim 1, wherein the steps of claim 1 are implemented on a computer infrastructure maintained, deployed, created and supported by a service provider on one of a fee and/or subscription basis.

9. The method of claim 1, further comprising determining whether the user chooses an enhancement rendering from the context menu prior to obtaining the instructions describing the one or more levels of the enhancement rendering of the object.

10. The method of claim 9, further comprising determining whether object modification is necessary after obtaining the instructions describing the one or more levels of the enhancement rendering of the object and prior to determining the status of the user.

11. The method of claim 1, further comprising allowing the user to change status after determining the status of the user and prior to providing the one or more levels of the enhancement rendering of the object in the virtual universe.

12. The method of claim 1, further comprising determining whether the object has the possibility of being enhanced, prior to determining whether the one or more levels of enhancement rendering on the display device is to be applied to the object displayed on the display device.

13. The method of claim 12, further comprising maintaining a standard rendering of the object to the user if it is determined that the object cannot be enhanced.

14. The method of claim 13, further comprising using a tag interpreter to view metadata of the object to determine the total number of levels of enhancement that are available for the object.

* * * * *